(12) United States Patent
Ishikawa et al.

(10) Patent No.: US 12,343,835 B2
(45) Date of Patent: Jul. 1, 2025

(54) COOLING MEDIUM SPRAY DEVICE

(71) Applicant: NT TOOL CORPORATION, Takahama (JP)

(72) Inventors: Hitoshi Ishikawa, Takahama (JP); Hiroyuki Suzuki, Kariya (JP)

(73) Assignee: NT TOOL CORPORATION, Takahama (JP)

( * ) Notice: Subject to any disclaimer, the term of this patent is extended or adjusted under 35 U.S.C. 154(b) by 402 days.

(21) Appl. No.: 17/924,164

(22) PCT Filed: Apr. 7, 2021

(86) PCT No.: PCT/JP2021/014816
§ 371 (c)(1),
(2) Date: Nov. 9, 2022

(87) PCT Pub. No.: WO2021/229962
PCT Pub. Date: Nov. 18, 2021

(65) Prior Publication Data
US 2023/0173631 A1    Jun. 8, 2023

(30) Foreign Application Priority Data
May 12, 2020   (JP) .................................. 2020-084088

(51) Int. Cl.
*B23Q 11/10* (2006.01)
*B05B 9/04* (2006.01)
*B05B 12/08* (2006.01)

(52) U.S. Cl.
CPC ............ *B23Q 11/10* (2013.01); *B05B 9/0416* (2013.01); *B05B 9/0426* (2013.01); *B05B 12/087* (2013.01)

(58) Field of Classification Search
CPC ................ B23Q 11/0075; B23Q 11/10; B23Q 11/1015; B23Q 11/1023; B23Q 11/103;
(Continued)

(56) References Cited

U.S. PATENT DOCUMENTS 3,781,024 A * 12/1973 Ganser .................. B23Q 11/10
418/196
4,534,803 A    8/1985 Asano et al.
(Continued)

FOREIGN PATENT DOCUMENTS

CN    205043547 U    2/2016
CN    107617752 A    1/2018
(Continued)

OTHER PUBLICATIONS

English translation of the Written Opinion of the International Searching Authority for parent application No. PCT/JP2021/014816.
(Continued)

*Primary Examiner* — Darren W Gorman
(74) *Attorney, Agent, or Firm* — J-TEK LAW PLLC; Jeffrey D. Tekanic; Scott T. Wakeman (57) ABSTRACT

A body member (110) of a coolant medium spray device (100) is attachable to a main shaft (10) of a machine tool. A rotating part of a pump (300) is connected to the body member. The body member and the rotating part are rotatably supported within an interior space of a support part, which may be constituted by a cover (210), a case (220) and a ring member (225). When the body member is attached to the main shaft, the support part is also fixed to the machine tool so that the support part is non-rotatable relative to the machine tool. In this state, cooling medium that is being supplied via the main shaft is pressurized by the pump and then sprayed out of a spray port (242) of a nozzle (240) that is mounted in a nozzle mounting hole (231) of a cap (230) affixed to the support part.

20 Claims, 3 Drawing Sheets

(58) Field of Classification Search
CPC ............ B23Q 11/1069; B23Q 11/1076; B23Q 11/1084; B23Q 2220/008; B23Q 2230/002; B05B 9/0416; B05B 9/0426; B05B 12/087
See application file for complete search history.

(56) References Cited

U.S. PATENT DOCUMENTS

| | | | | |
|---|---|---|---|---|
| 4,598,617 | A * | 7/1986 | Kubo | B23Q 1/0036 82/158 |
| 4,652,189 | A | 3/1987 | Mizoguchi | |
| 5,494,134 | A | 2/1996 | Mcconkey | |
| 6,409,641 | B1 * | 6/2002 | Hashimoto | B23Q 11/10 409/137 |
| 7,293,943 | B1 * | 11/2007 | Matsumura | B23Q 11/10 409/232 |
| 7,563,062 | B1 * | 7/2009 | Chen | B23Q 5/045 408/124 |
| 2006/0196325 | A1 | 9/2006 | Sakai | |
| 2007/0145075 | A1 | 6/2007 | Divisi | |
| 2010/0270757 | A1 * | 10/2010 | Beckington | B23B 31/1179 279/20 |
| 2013/0108380 | A1 * | 5/2013 | Lee | B23Q 11/10 279/20 |
| 2017/0023926 | A1 | 1/2017 | Kijima et al. | |
| 2017/0106485 | A1 | 4/2017 | Kuyo et al. | |
| 2017/0355054 | A1 * | 12/2017 | Nakamaru | B23Q 11/103 |
| 2020/0171610 | A1 * | 6/2020 | Otani | B23Q 3/12 |
| 2024/0351112 | A1 | 10/2024 | Ishikawa et al. | |
| 2024/0367186 | A1 | 11/2024 | Ishikawa et al. | |

FOREIGN PATENT DOCUMENTS

| | | |
|---|---|---|
| CN | 108687566 A | 10/2018 |
| EP | 0669187 A2 | 8/1995 |
| JP | S5976749 A | 5/1984 |
| JP | S59171050 U | 11/1984 |
| JP | S6185339 U | 6/1986 |
| JP | S624550 A | 1/1987 |
| JP | H01222842 A | 9/1989 |
| JP | H0392244 A | 4/1991 |
| JP | H0482606 A | 3/1992 |
| JP | H0557690 A | 3/1993 |
| JP | 2003025183 A | 1/2003 |
| JP | 2006167862 A | 6/2006 |
| JP | 2015033731 A | 2/2015 |
| JP | 2017074653 A | 4/2017 |
| TW | M333260 U | 6/2008 |
| WO | 2017013738 A1 | 1/2017 |

OTHER PUBLICATIONS

English translation the International Search Report dated Jul. 6, 2021, for parent application No. PCT/JP2021/014816.
Extended European Search Report from the European Patent Office dispatched Aug. 21, 2023, in related EP application No. 21 80 5010, including European Search Opinion, Supplementary European Search Report and examined claims 1-3.
Unpublished U.S. Appl. No. 18/683,385, inventors: Ishikawa et al., 371 filing date: Feb. 14, 2024.
Unpublished U.S. Appl. No. 18/683,390, inventors: Ishikawa et al., 371 filing date: Feb. 14, 2024.
Unpublished U.S. Appl. No. 18/683,566, inventors: Ishikawa et al., 371 filing date: Feb. 14, 2024.
Office Action from the Japanese Patent Office dispatched Nov. 19, 2024 in related Japanese application No. 2021-137917, and machine translation thereof.
Office Action from the Taiwanese Patent Office dispatched Dec. 25, 2024 in related Taiwanese application No. 110116877, and translation thereof.
Supplementary European Search Report from the European Patent Office dated Oct. 23, 2024, in related EP application No. 22 858 078.3, including Search Opinion, Search Report and examined claims 1-5.
Supplementary European Search Report from the European Patent Office dated Oct. 29, 2024, in related EP application No. 22 86 0830.3, including Search Opinion, Search Report and examined claims 1-3.

* cited by examiner

COOLING MEDIUM SPRAY DEVICE

CROSS-REFERENCE

This application is the US national stage of International patent application no. PCT/JP2021/014816 filed on Apr. 7, 2021, which claims priority to Japanese patent application no. 2020-084088 filed on May 12, 2020.

TECHNICAL FIELD

The present invention relates to a cooling medium (coolant) spray device that sprays (ejects) a cooling medium that is being supplied from a main shaft of a machine tool.

BACKGROUND ART

In a machine tool for cutting a metal workpiece, a tool holder that is mountable on a main shaft (which is called as a "spindle") of the machine tool is used. Furthermore, when machining a workpiece using a tool, it is necessary to supply a cooling medium such as an oil to a cutting edge of the tool in order to provide lubrication between the workpiece and the tool, to cool the workpiece or the tool, to remove (clean) of chips (sometimes called "swarf") generated by the machining operation, or the like. Therefore, a tool holder, which is provided with a cooling medium supply mechanism that sprays (ejects) the cooling medium that is being supplied from the main shaft of the machine tool to a cutting edge of the tool, is used. Furthermore, in order to be able to spray the cooling medium in a stable manner, Japanese Unexamined Patent Application Publication No. S62-4550 (hereinafter, "Patent Document 1") discloses a tool holder, which is provided with a cooling medium supply mechanism constituted by a pump that has a rotating part coupled to the main shaft.

SUMMARY OF THE INVENTION

Chips generated during machining of a workpiece cannot be sufficiently removed using a cooling medium sprayed from a cooling medium supply mechanism provided in a tool holder at the (relatively low) pressure of the cooling medium that is being supplied from a main shaft of a typical machine tool. In addition, burrs generated during machining of the workpiece also cannot be sufficiently removed using relatively low pressure cooling medium.

Therefore, after having machined the workpiece, the operator may be required to manually remove chips and burrs left on the workpiece.

In order to overcome this problem, it might be considered to improve the chip/burr removal effectiveness by simply increasing the pressure of the cooling medium that is sprayed from (out of) the cooling medium supply mechanism provided in the tool holder.

But, in order to increase the pressure of the cooling medium that is sprayed from the cooling medium supply mechanism provided in the tool holder, it would be required to increase the pressure of the cooling medium that is being supplied from (via) the main shaft of the machine tool.

However, in order to increase the pressure of the cooling medium that is being supplied from the main shaft of the machine tool, it would be required to design the machine tool according to high pressure specifications, which would thus be costly.

Alternatively, if a tool holder provided with a cooling medium supply mechanism constituted by a pump that has a rotating part coupled to a main shaft as disclosed in Patent Document 1 is used, it might be considered to increase the pressure of the cooling medium that is sprayed from (out of) the cooling medium supply mechanism by increasing the rotational speed of the rotating part of the pump.

However, the tool holder disclosed in Patent Document 1 sprays the cooling medium to a cutting edge, etc. of a tool while simultaneously machining a workpiece using the tool held by the tool holder. Therefore, there is a limit to increasing the rotational speed of the tool holder.

Further, in the tool holder disclosed in Patent Document 1, because the spray port of the cooling medium supply mechanism rotates together with the main shaft, the cooling medium sprayed from (out of) the spray port is scattered by centrifugal force. Therefore, the cooling medium cannot be sprayed toward a prescribed location in a focused manner. Specifically, the cooling medium cannot be sprayed in a focused manner to a location where chips tend to be left unremoved or to a location where burrs tend to be generated.

It is therefore one non-limiting object of the present teachings to provide a cooling medium spray device that can increase the pressure of a cooling medium that is being supplied from a main shaft of a machine tool while spraying the pressurized cooling medium toward a prescribed location in a focused manner.

In one aspect of the present teachings, a coolant medium (coolant) spraying device may include a body part, a support part, a pump, a cap and a nozzle.

The body part is configured to be couplable (attached) to a main shaft of a machine tool. In addition, the body part has a body part passage through which a cooling medium (coolant, lubricant) that is being supplied from the main shaft is passed (flows) in the state in which (while) the body part is coupled to the main shaft of the machine tool. Various methods can be used to couple (attach) the body part to the main shaft. For example, a method that attaches a pull stud to a rear end side of the body part and pulls the pull stud toward the main shaft can be used.

The support part is formed in a tubular shape, and the body part is rotatably supported within a support part interior space. The support part is fixed to the machine tool in the state in which the body part has been coupled to the main shaft. For example, the support part is configured such that the body part is non-rotatable relative to the support part in the state in which (when) the body part is not coupled to the main shaft (in the state in which (when) the support part is not fixed to the machine tool), and the body part is rotatable relative to the support part in the state in which (when) the body part is coupled to the main shaft (in the state in which (when) the support part is fixed to the machine tool). Various methods can be used to fix the support part to the body part. Further, the support part has a first passage and a second passage through which the cooling medium passes (flows).

The pump has a rotating part, an inlet port and an outlet port. The rotating part of the pump is rotatably supported within the support part interior space of the support part while being connected to the body part. By rotating the rotating part, the pump increases the pressure of the cooling medium suctioned from the inlet port and discharges the pressurized cooling medium from the outlet port. A variety of configurations of pumps can be used as the pump. The rotating part of the pump may be rotated in conjunction with rotation of the body part, and it may be directly connected to the body part or connected via another member or other members.

The cap can be mounted at a location of the support part that is on an opposite side of the body part from the pump so as to close the support part interior space of the support part. In addition, the cap has a nozzle hole in which the nozzle is mounted, and a cap passage that communicates with the nozzle hole.

The nozzle is formed with a nozzle passage having a spray port, and the nozzle is mounted in the nozzle hole of the cap such that the nozzle passage (fluidly) communicates with the nozzle hole.

In the present aspect, the body part passage of the body part is configured to (fluidly) communicate with the inlet port of the pump via the first passage of the support part, and the outlet port of the pump is configured to (fluidly) communicate with the cap passage of the cap via the second passage of the support part.

In the state in which the body part, which is coupled to the main shaft, has been connected to the rotating part of the pump, the rotational speed of the main shaft is set such that cooling medium having a prescribed pressure is sprayed from (out of) the spray port of the nozzle.

In a cooling medium spray device of the present aspect, the cooling medium can be sprayed in a prescribed direction in a focused manner while the pressure of the cooling medium that is being supplied from the main shaft of the machine tool can be increased to a pressure capable of removing chips and burrs generated during machining of a workpiece. Thus, by using the cooling medium spray device of the present aspect, chips and burrs left on the workpiece after machining can be reliably removed at a low cost with a simple configuration.

In another aspect of the present teachings, a pressure control part, which prevents the pressure of the cooling medium that is being discharged from the outlet port of the pump from exceeding a set value, is provided. Pressure control parts having various known configurations can be used as the pressure control part.

In this aspect, excessive pressure of the cooling medium can be prevented.

In another aspect of the present teaching, a filter that removes foreign matter contained in the cooling medium is provided in the body part passage. A variety of known filters can be used as the filter.

In this aspect, a lubricating effect, a cooling effect and a cleaning effect can be enhanced.

By using a cooling medium spray device according to the present teachings, the pressure of the cooling medium that is being supplied from the main shaft of the machine tool can be increased and the pressurized cooling medium can be sprayed toward a prescribed location in a focused manner. Thus, chips and burrs left on a workpiece after machining can be easily and reliably removed.

DETAILED DESCRIPTION

The following detailed description merely intended to teach a person skilled in the art detailed information for practicing preferred exemplary embodiments of the present invention. The technical scope of the present invention is not limited by the detailed description and is to be determined based on the scopes of the claims. For this reason, combinations of configurations and methods in the following detailed description are not necessary to practice the invention in the broadest sense, and are limited to disclosing representative examples of the present invention in the detailed description, which will be provided by using reference numbers shown in the accompanying drawings.

Thus, an embodiment of a cooling medium spray device 100 of the present teaching is described with reference to the drawings hereinbelow.

It is noted that, hereinbelow, a direction along a center line P of the cooling medium spray device 100 is called the "axial direction". Furthermore, in the axial direction, the side on which a nozzle 240 is disposed (right side in FIG. 1) is called the "front end side". In addition, in the axial direction, the side (the side on which a body member 110 is disposed) opposite to the side on which the nozzle 240 is disposed (left side in FIG. 1) is called the "rear end side".

Figure 1:
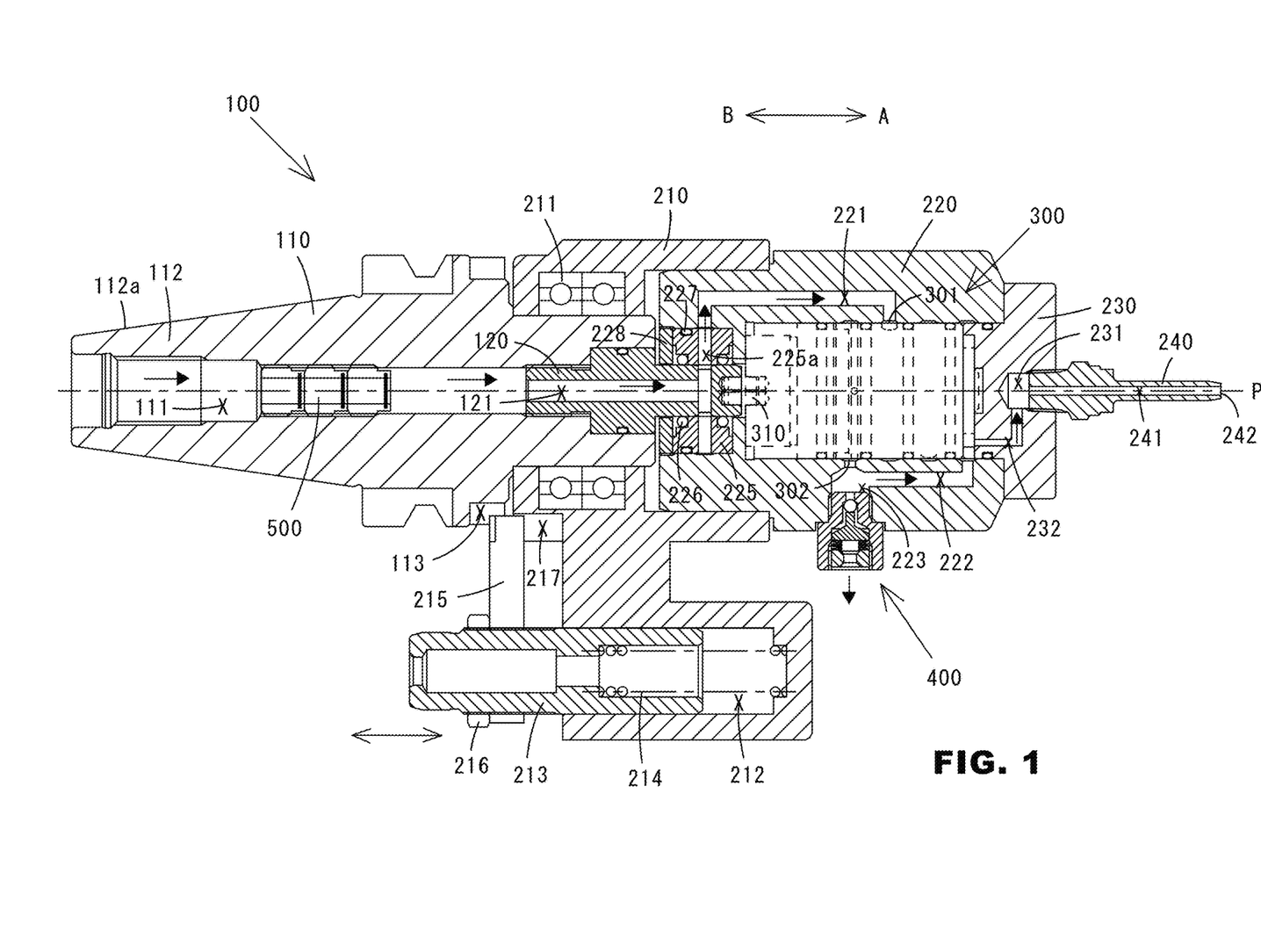
FIG. 1 is a sectional view of a cooling medium spray device of one embodiment of the present teachings.
Figure 2:
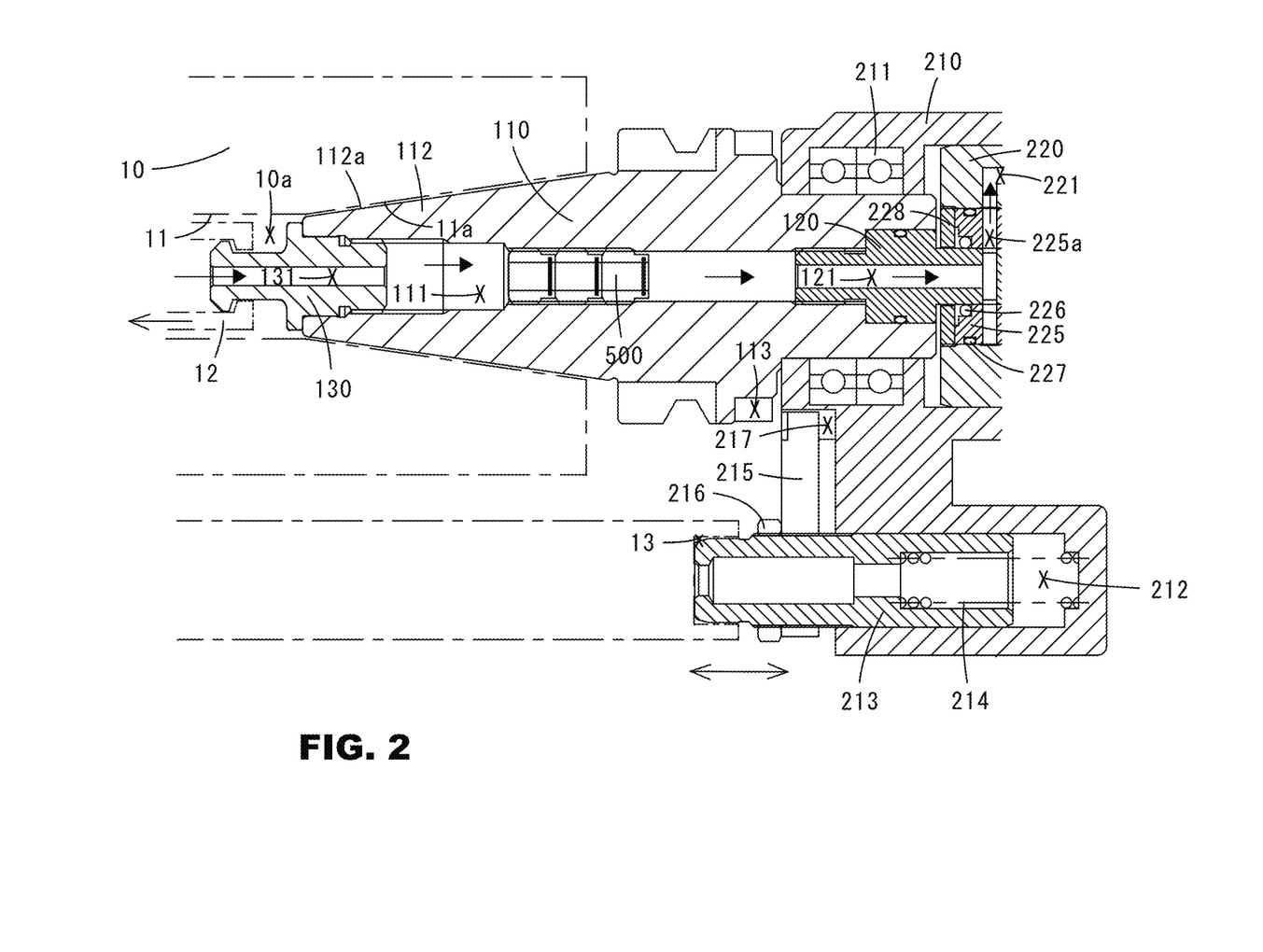
FIG. 2 is a drawing that explains a movement involved in attaching the cooling medium spray device to a machine tool.

One embodiment of the cooling medium spray device 100 is described with reference to FIGS. 1 to 3

The cooling medium spray device 100 of this embodiment includes a body part, a support part, a cap 230, a nozzle 240, a pump 300, a relief valve 400 and a filter 500.

The body part is constituted by a body member 110 and an adapter 120.

The body member 110 has a shank part 112 that is coupled to a main shaft of a machine tool at the rear end side. A body member outer peripheral surface part 112a corresponding to (defined on) the shank part 112 has a tapered surface that is inclined such that the outer diameter decreases in the direction from the front end side toward the rear end side. As will be further described below, the tapered surface of the body member outer peripheral surface part 112a is formed to be capable of taper fitting with a tapered surface of a main shaft inner peripheral surface part 11a of a main shaft 10 of a machine tool. Furthermore, as will be described below, the body member 110 has an engagement part 113 that is engageable with a rotation stopping lever 215 provided on a cover 210.

The body member 110 also has a body member passage (conduit) 111 extending through the center in the axial direction. The body member passage 111 is formed such that cooling medium that is being supplied from the main shaft 10 passes (flows) therethrough in the state in which the shank part 112 of the body member 110 has been coupled to the main shaft 10.

The filter 500 is arranged within the body member passage 111 and removes foreign matter contained in the cooling medium passing through the body member passage 111. A variety of known filters capable of removing foreign matter contained in the cooling medium can be used as the filter 500.

The adapter 120 is mounted on the front end side of the body member 110. In this embodiment, a portion on the rear end side of the adapter 120 is inserted from the front end side of the body member 110 into the body member passage 111 of the body member 110 and screw fastened together. In addition, a portion on the front end side of the adapter 120 protrudes from a front end surface of the body member 110. A sealing member such as an O-ring is disposed between the body member 110 and the adapter 120.

The adapter 120 has an adapter passage (conduit) 121 through which the cooling medium passes (flows). The adapter passage 121 has a first passage portion extending in the axial direction and a second passage portion fluidly connected to a front end of the first passage portion and extending in a radial direction. A rear end side of the first passage portion communicates with the body member passage 111, and the second passage portion is open to an outer peripheral surface of the portion on the front end side of the adapter 120.

The "body part" of the present embodiment is constituted by the body member 110 and the adapter 120; the "body part passage" of the present embodiment is constituted by the body member passage 111 and the adapter passage 121.

The support part rotatably supports the body part (the body member 110 and the adapter 120) and a rotating part of the pump 300. The support part is constituted by the cover 210, a case 220 and a ring member 225.

The body member 110 is rotatably disposed within a cover interior space of the cover 210 via a bearing 211. Thus, the body member 110 is rotatable relative to the cover 210.

Further, the cover 210 has a hole 212. The hole 212 is formed at a location that is spaced apart more radially outward (in a direction away from the center line P) than the cover interior space of the cover 210 in which the body member 110 is disposed, and extends in the axial direction. With regard to the hole 212, the rear end side is open. A rotation stopping (blocking) pin 213 is inserted (disposed) within the hole 212 so as to be movable in the extension direction of the hole 212. Owing to the elastic force of a spring 214, the rotation stopping pin 213 receives a biasing force that moves it in a direction (rear end side) coming out from the hole 212, i.e. leftward in FIG. 1.

The rotation stopping lever 215 is fixed to a rear end side of the rotation stopping pin 213. The axial position of the rotation stopping lever 215 is adjustable by a nut 216 that is screwed onto the rotation stopping pin 213.

In addition, the cover 210 has a groove 217 that is shaped to receive the rotation stopping lever 215.

In the state in which (when) the body member 110 is not coupled to the main shaft 10 (the state in which (when) the cover 210 is not fixed to the machine tool), the rotation stopping pin 213 moves in the direction (rear end side) coming out from the hole 212 owing to the elastic force of the spring 214. As a result, the rotation stopping lever 215 is engaged with the engagement part 113 of the body member 110 and rotation of the body member 110 relative to the cover 210 is prevented (blocked).

On the other hand, in the state in which (when) the body member 110 is coupled to the main shaft 10 (the state in which the cover 210 is fixed to the machine tool), the rotation stopping pin 213 receives a force that moves it in a direction (front end side) that causes it to be inserted into the hole 212 against the elastic force of the spring 214 (described in further detail below). As a result, the rotation stopping lever 215 moves from a position at which it engages the engagement part 113 of the body member 110 to a position at which it is received in the groove 217 of the cover 210. When the engagement of the rotation stopping lever 215 with the engagement part 113 of the body member 110 is released, the body member 110 becomes rotatable relative to the cover 210.

The case 220 is fixed to the front end side of the cover 210 by one or more bolts, or the like.

The case 220 has a first case passage (conduit) 221 and a second case passage (conduit) 222.

The ring member 225 is disposed between a portion of the rear end side of the case 220 and a portion of the front end side of the adapter 120. The ring member 225 has a ring member passage (conduit) 225a that extends in the radial direction and is open to an inner peripheral surface of the ring member 225 and to an outer peripheral surface of the ring member 225. The ring member 225 is arranged such that the ring member passage 225a (fluidly) communicates with the adapter passage 121 (the second passage portion) and the first case passage 221.

A sealing member 226 (such as an O-ring) is disposed between the ring member 225 and the adapter 120, and a sealing member 227 (such as an O-ring) is disposed between the ring member 225 and the case 220.

The ring member 225 is prevented from rotating by being pressed by a fixed member 228 that is screwed into an inner peripheral surface of the case 220.

The "support part interior space" of the present embodiment is constituted by the cover interior space of the cover 210, the case interior space of the case 220 and the ring member interior space of the ring member 225.

The pump 300 increases (pressurizes) the pressure of the cooling medium. A variety of known pumps having a fixed part and a rotating part can be used as the pump 300. In this embodiment, an internal gear pump having the case 220 (fixed part) and a rotating part that is rotatably supported within the case interior space of the case 220 is used. The fixed part of the pump 300 is constituted by the portion of the case 220 that corresponds to (surrounds) the rotating part of the pump 300.

A rear end side of the rotating part of the pump 300 is connected to the body member 110 to rotate therewith. In this embodiment, the rear end side of the rotating part of the pump 300 is connected via a knock pin 310 to the adapter 120, which is connected to the body member 110. Further, a portion of the front end side of the rotating part of the pump 300 is rotatably supported within a recess of the cap 230 (described below). In other words, the rotating part of the pump 300 is rotatably supported within the case interior space of the case 220. Thus, the rotating part of the pump 300 rotates in conjunction with rotation of the body member 110 that has been coupled to the main shaft 10.

The pump 300 has an inlet port 301 and an outlet port 302. Furthermore, when the rotating part of the pump 300 rotates, the pressure of the cooling medium that is being suctioned from the inlet port 301 is increased (pressurized) and thus pressurized cooling medium is discharged from the outlet port 302.

The outlet port 302 (fluidly) communicates with the second case passage 222.

The "support part" of the present embodiment is constituted by the cover 210, the case 220 and the ring member 225; the "first passage of the support part" of the present embodiment is constituted by the ring member passage 225a and the first case passage 221; and the "second passage of the support part" of the present embodiment is constituted by the second case passage 222.

Further, the case 220 has a discharge passage (conduit) 223 that branches from the second case passage 222. The relief valve 400 is disposed in the discharge passage 223.

Figure 3:
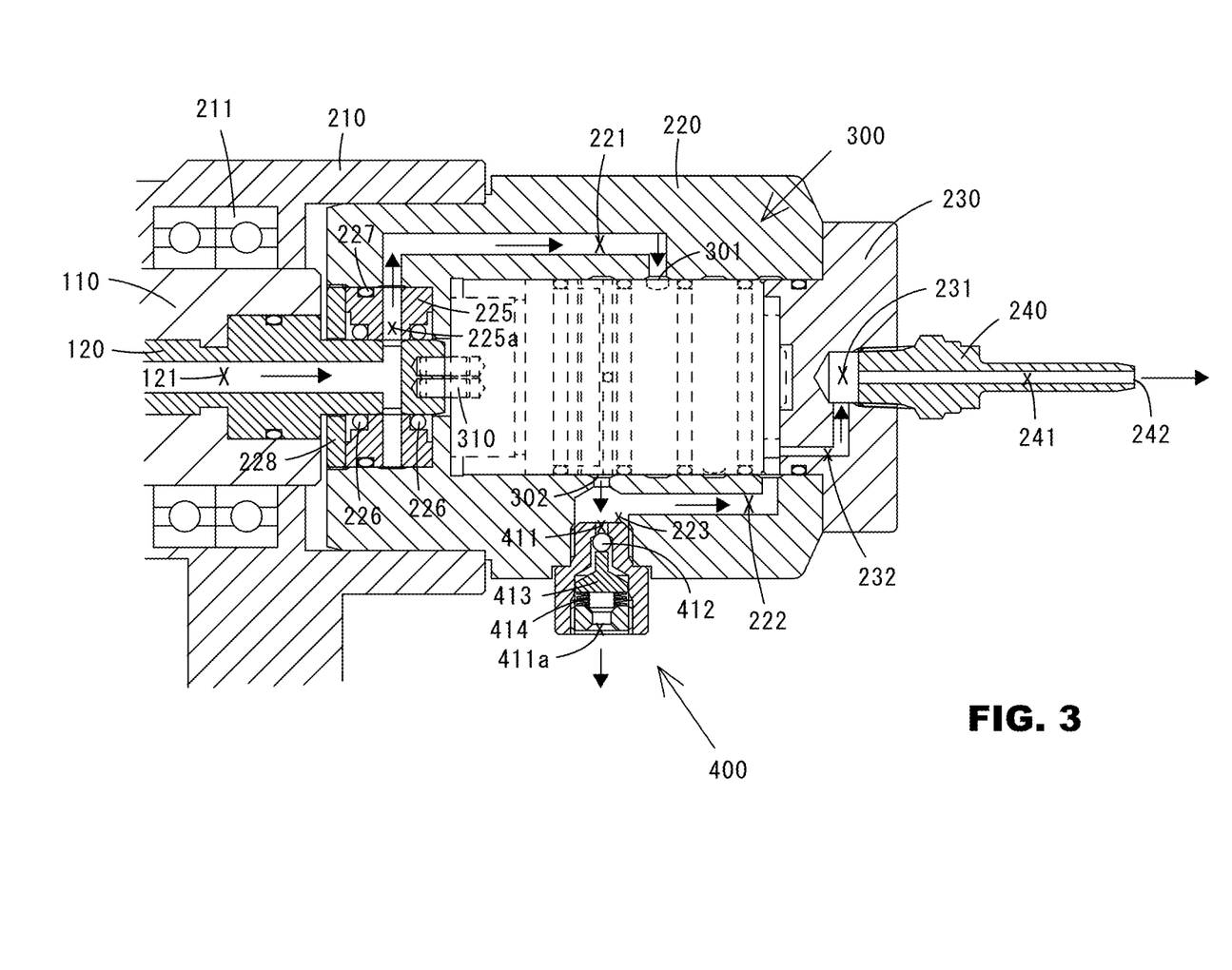
FIG. 3 is a partial, enlarged view of a portion of FIG. 1.

As shown in FIG. 3, with regard to the relief valve 400, a steel ball (valve element) 412, a valve support 413 and a relief spring 414 are disposed in a relief valve passage 411 in this order in the direction from the second case passage 222 side to an outlet port 411a side.

The relief valve 400 prevents the pressure of the cooling medium within the second case passage 222 from becoming a set value or higher. Specifically, when the pressure of the cooling medium within the second case passage 222 becomes the set value or higher, the steel ball 412 and the valve support 413 move against the elastic force of the relief spring 414 toward the side opposite of the second case passage 222. As a result, cooling medium within the second case passage 222 is discharged from the outlet port 411a, and the pressure of the cooling medium within the second case passage 222 decreases. When the pressure of the cooling medium within the second case passage 222 decreases, the steel ball 412 and the valve support 413 move toward the second case passage 222 side owing to the elastic force of the relief spring 414.

The cap 230 is fixed to the front end side of the case 220 by one or more bolts or the like so as to close up the case interior space of the case 220.

The cap 230 has a nozzle mounting hole 231 in which the nozzle 240 is mounted, and a cap passage (conduit) 232 that (fluidly) communicates with the nozzle mounting hole 231.

The cap 230 is fixed to the case 220 such that the cap passage 232 (fluidly) communicates with the second case passage 222 of the case 220.

The nozzle 240 has a nozzle passage (conduit) 241 that (fluidly) communicates with a spray port 242. The nozzle 240 is mounted in the nozzle mounting hole 231 of the cap 230. In this embodiment, the nozzle 240 is mounted in the nozzle mounting hole 231 by a threaded engagement of a male thread formed on an outer peripheral surface of a rear end side of the nozzle 240 with a female thread formed on an inner peripheral surface of the nozzle mounting hole 231.

An example of method for attaching the cooling medium spray device 100 of this embodiment to a machine tool is now described with reference to FIG. 2.

A pull stud 130 is attached to a rear end side of the body member 110. For example, a female thread formed on a body member inner peripheral surface that forms the body member passage 111 is threadedly engaged with a male thread formed on an outer peripheral surface of the pull stud 130. The pull stud 130 has a pull stud passage (conduit) 131 that extends through the center in the axial direction, in which both ends are open. By attaching the pull stud 130 to the rear end side of the body member 110, the body member passage 111 (fluidly) communicates with the pull stud passage 131.

A portion of the rear end side of the pull stud 130 is inserted into a main shaft interior space 10a that is formed by a main shaft inner peripheral surface 11 of the main shaft 10 of the machine tool. The pull stud 130 is then pulled in the direction of the arrow (to the left in FIG. 2, toward the rear end side of the main shaft 10) using a pulling-in member 12 provided on the machine tool side. The main shaft inner peripheral surface part 11a of the front end side of the main shaft inner peripheral surface 11 is formed as a tapered surface that is inclined such that the inner diameter decreases in the direction from the front end side toward the rear end side. Thus, when the pull stud 130 is pulled into the main shaft interior space 10a, the main shaft inner peripheral surface part 11a is taper-fitted with the body member outer peripheral surface part 112a, and the body member outer peripheral surface part 112a (the shank part 112) is fixedly held by the main shaft inner peripheral surface part 11a. In this manner, the body member 110 is coupled to the main shaft 10.

Further, by moving the body member 110 toward the rear end side of the main shaft 10, the cover 210 also moves toward the rear end side of the main shaft 10. Then, when the rear end part of the rotation stopping pin 213 of the cover 210 is inserted into a fitting hole 13 formed on the machine tool side, the rotation stopping pin 213 is pressed in the direction (front end side) of being inserted into the hole 212 against the elastic force of the spring 214.

When the rotation stopping pin 213 is moved toward the front end side, the rotation stopping lever 215, which is fixed to the rotation stopping pin 213, also moves toward the front end side. Then, in the state in which the body member 110 is coupled to the main shaft 10, the rotation stopping lever 215 moves from a position at which it engages with the engagement part 113 of the body member 110 to a position at which it is received in the groove 217. When the engagement of the rotation stopping lever 215 with the engagement part 113 is released, the body member 110, the adapter 120 connected to the body member 110, and the rotating part of the pump 300 become rotatable relative to the cover 210 and to the case 220 that is fixed to the cover 210.

It is noted that, by inserting the rear end part of the rotation stopping pin 213 into the fitting hole 13, the rotation stopping pin 213 is fixed to the machine tool. Thus, the cover 210 and the case 220 are fixed to the machine tool in the state of being restricted (blocked) from rotating around the center line P. Further, by receiving the rotation stopping lever 215, which is fixed to the rotation stopping pin 213, in the groove 217, rotation of the rotation stopping lever 215 around the rotation stopping pin 213 is restricted (blocked).

In such a state, when the main shaft 10 rotates, the body member 110 coupled to the main shaft 10 rotates. Further, the rotating part of the pump 300, which is connected to the body member 110 via the adapter 120 and the knock pin 310, rotates.

When the rotating part of the pump 300 rotates, cooling medium supplied from the main shaft 10 is suctioned from the inlet port 301 of the pump 300 via the pull stud passage 131, the body member passage 111 (including the filter 500), the adapter passage 121, the ring member passage 225a and the first case passage 221. Then, the cooling medium, which has been pressurized by the pump 300, is led into the nozzle passage 241 via the outlet port 302 of the pump 300, the second case passage 222, the cap passage 232 and the nozzle mounting hole 231. Then, the pressurized cooling medium is sprayed from (out of) the spray port 242.

In this embodiment, the cover 210 is fixed to the machine tool, the case 220 is fixed to the cover 210, the cap 230 is fixed to the case 220, and the nozzle 240 is attached to the cap 230. That is, the nozzle 240 is fixed to the machine tool via the cap 230, the case 220 and the cover 210 so as to be not rotatable relative to the machine tool. Therefore, unlike in the above-described prior art, the cooling medium that is sprayed from the spray port 242 of the nozzle 240 is not affected by centrifugal force caused by rotation of the spray port. As a result, the cooling medium can be sprayed (ejected) toward a prescribed location in a focused manner.

Foreign matter contained in the cooling medium is removed by the filter 500 disposed in the body member passage 111.

Further, the pressure of the cooling medium is prevented by the relief valve 400 from becoming a set value or higher.

In this embodiment, a "switching mechanism that switches from a cooling medium spray restricted (blocked) state, in which rotation of the body part relative to the support part is restricted (blocked), to a cooling medium spray allowed state, in which rotation of the body part (the rotating part of the pump connected to the body part) relative to the support part is allowed" is constituted by the rotation stopping pin 213 provided on the cover 210 (the support part), the rotation stopping lever 215 provided on the rotation stopping pin 213, the fitting hole 13 provided on the machine tool side, the engagement part 113 provided on the body member 110 (the body part) and the groove 217 provided in the cover 210 (the support part).

An example of operation when machining a workpiece using a tool is now described. In the following, a machine tool (a so-called "machining center"), which is equipped with a tool magazine that is capable of housing a plurality of tool holders each holding a tool, in which a tool holder, which has been selected in accordance with the machining program from among the tool holders housed in the tool magazine, is mounted on the main shaft, and which machine tools machines a workpiece using the tool held in the selected tool holder, will be explained. It is noted that it is configured such that cooling medium is suppliable from the main shaft 10 to the tool holder mounted on the main shaft 10.

The cooling medium spray device 100 of this embodiment is housed in the tool magazine together with the plurality of tool holders.

A workpiece is attached to the machine tool.

A tool holder holding a tool required for the machining is selected from among the tool holders housed in the tool magazine, and is mounted on the main shaft 10. Then, by rotating the main shaft 10, the workpiece is machined using the tool held by the tool holder mounted to the main shaft 10. At this time, cooling medium, which is supplied from the main shaft 10, is supplied to the tool side.

After the workpiece machining has been performed, the cooling medium spray device 100 housed in the tool magazine is set to a ready-for-use state. For example, the body member 110 is coupled to the main shaft 10, and the cover 210 is fixed to the machine tool (the body side on which the main shaft 10 is rotatably supported). As a result, cooling medium that is being supplied from the main shaft 10 is set to a ready-to-be-sprayed state from the spray port 242 of the nozzle 240.

Then, the rotational speed of the main shaft 10, on which the body member 110 of the cooling medium spray device 100 is mounted, is set such that the pressure of the cooling medium, which is sprayed from the spray port 242 of the nozzle 240 of the cooling medium spray device 100, becomes a (higher) pressure capable of removing chips and burrs left on the workpiece.

Then, by moving the cooling medium spray device 100 (or the workpiece), cooling medium is sprayed (ejected) from the spray port 242 of the nozzle 240 toward a location where chips are left unremoved (or chips tend to be left unremoved) on the machined workpiece or toward a location where burrs are generated (or burrs tend to be generated) on the machined workpiece.

As described above, by using the cooling medium spray device 100 of this embodiment, chips left on the machined workpiece or burrs formed on the workpiece during machining can be reliably removed in a short time with a simple structure without the need for removal by manual labor of an operator.

It is noted that operations for removing chips and burrs by using the cooling medium spray device 100 is not limited to the above-described operation.

The present invention is not limited to the configurations described in the embodiment, and a variety of modifications, additions and omissions are possible.

For example, although the body part is constituted by the separate body member and the adapter in the embodiment, the body part can instead be constituted by an appropriate number, which includes one, of member(s). In addition, the shape and configuration of the body part can be changed in various ways.

Although the support part is constituted by the cover, the case and the ring member in the embodiment, the support part can instead be constituted by an appropriate number, which includes one, of member(s). In addition, the shape and configuration of the support part can be changed in various ways.

The configuration that rotatably supports the body part relative to the support part is not limited to the configuration described in the embodiment.

In the state in which the body part is coupled to the main shaft, a method for fixing the support part to the machine tool is not limited to the method described in the embodiment.

A variety of configurations of known pumps having a fixed part, a rotating part, an inlet port and an outlet port can be used as the pump.

Various methods can be used to connect the body part and the rotating part of the pump.

The shape and configuration of the cap can be changed in various ways.

A variety of configurations of nozzles can be used as the nozzle.

The switching mechanism that switches between the cooling medium spray restricted (blocked) state, in which rotation of the body part relative to the support part is restricted, and the cooling medium spray allowed state, in which rotation of the body part relative to the support part while the support part is fixed to the machine tool is allowed, is not limited to the switching mechanism described in the embodiment.

A variety of configurations of the pressure control part other than the relief valve can be used as the pressure control part that controls (regulates) the pressure of the cooling medium. It is noted that the pressure control part can also be omitted.

A variety of known filters can be used as the filter that removes foreign matter contained in the cooling medium. It is noted that the filter can also be omitted.

The configurations described in the embodiment can be used individually or can be used in combination(s) of appropriately selected ones.

Although the cooling medium spray device of the present teachings is preferably used with a machine tool equipped with a tool magazine capable of housing a plurality of tool holders, it can also be used with a variety of configurations of machine tools other than this.

DESCRIPTION OF THE NUMERALS

10: main shaft of a machine tool, 10*a*: main shaft interior space, 11: main shaft inner peripheral surface, 11*a*: main shaft inner peripheral surface part, 12: pulling-in member, 13: fitting hole, 100: cooling medium spray device, 110: body member, 111: body member passage, 112: shank part, 113: engagement part, 120: adapter (connecting member), 121: adapter passage (connecting member passage), 130: pull stud, 131: pull stud passage, 210: cover, 211: bearing, 212: hole, 213: rotation stopping pin, 214: spring, 215: rotation stopping lever, 216: nut, 217: groove, 220: case, 221: first case passage, 222: second case passage, 223: discharge passage, 225: ring member, 225*a*: ring member passage, 226: sealing member, 227: sealing member, 228: fixed member, 230: cap, 231: nozzle mounting hole, 232: cap passage, 240: nozzle, 241: nozzle passage, 242: spray port, 300: pump, 301: inlet port, 302: outlet port, 310: knock pin, 400: relief valve, 411: relief valve passage, 411*a*: outlet, 412: steel ball (valve), 413: valve support, 414: relief spring, 500: filter

The invention claimed is:

1. A cooling medium spray device that pressurizes a cooling medium supplied from a main shaft of a machine tool and sprays the cooling medium, comprising:
a body part, a support part, a pump, a cap and a nozzle, wherein:
the body part has a body part passage that extends in an axial direction, the body part being configured such that it is couplable to the main shaft of the machine tool and the cooling medium supplied from the main shaft is passed through the body part passage in the state in which the body part has been coupled to the main shaft of the machine tool;
the support part has a support part interior space, in which the body part is disposed in a rotatable manner, and first and second passages, the support part being configured to be fixed to the machine tool in the state in which the body part has been coupled to the main shaft of the machine tool;
the pump has a rotating part, an inlet port and an outlet port, the rotating part being disposed in a rotatable manner within the support part interior space of the support part while being connected to the body part, and the pump being configured such that, by rotating the rotating part, the pressure of the cooling medium that is being suctioned from the inlet port is increased and it is discharged from the outlet port;
the cap has a nozzle hole in which the nozzle can be mounted, and a cap passage that communicates with the nozzle hole, the cap being configured to be mountable at a location of the support part that is on an opposite side of the body part from the pump so as to close up the support part interior space of the support part; and
the nozzle has a spray port and a nozzle passage that communicates with the spray port, the nozzle being configured such that the nozzle passage communicates with the cap passage in the state in which the nozzle has been mounted in the nozzle hole of the cap, and
the body part passage of the body part is configured to communicate with the inlet port of the pump via the first passage of the support part, and the outlet port of the pump is configured to communicate with the cap passage of the cap via the second passage of the support part.

2. The cooling medium spray device as defined in claim 1, comprising a pressure control part that prevents the pressure of the cooling medium discharged from the outlet port of the pump from exceeding a set value.

3. The cooling medium spray device as defined in claim 2, wherein a filter that removes foreign matter contained in the cooling medium is provided in the body part passage.

4. The cooling medium spray device as defined in claim 1, wherein a filter configured to remove foreign matter contained in the cooling medium is disposed within the body part passage.

5. The cooling medium spray device as defined in claim 1, wherein:
the body part passage has a first passage portion having a longitudinal extension that extends in the axial direction,
the body part passage has a second passage portion that is fluidly connected with the first passage portion of the body part,
the second passage portion has a longitudinal extension that extends in a radial direction that is perpendicular to the axial direction, and
the second passage portion of the body part passage is fluidly connected with the first passage of the support part.

6. The cooling medium spray device as defined in claim 1, wherein the inlet port and the outlet port of the pump are each fluidly connected with the support part interior space of the support part such that cooling medium flows radially through the inlet port and through the outlet port.

7. The cooling medium spray device as defined in claim 1, wherein:
the support part has a cover that partially defines the support part interior space and surrounds a portion of the body part, and
the cover is configured to be coupled to the machine tool so that the cover is not rotatable relative to the machine tool in the state in which the body part has been coupled to the main shaft of the machine tool.

8. The cooling medium spray device as defined in claim 7, wherein the cover comprises:
a rotation stopping pin movably disposed in a hole, the rotation stopping pin being biased in parallel to the axial direction towards a rear end side of the cooling medium spray device, and
a rotation stopping lever extending from the rotation stopping pin in a direction perpendicular to the axial direction,
wherein the cover is configured such that attachment of the cooling medium spray device to the machine tool causes the rotation stopping pin to be pushed towards a front end side of the cooling medium spray device from a first position, in which the rotation stopping lever is engaged in an engagement part of the body part to block rotation of the body part and the rotating part of the pump relative to the support part, to a second position, in which the rotation stopping lever is disengaged from engagement part of the body part to allow rotation of the body part and the rotating part of the pump relative to the support part.

9. The cooling medium spray device as defined in claim 1, wherein the nozzle is configured to be not rotatable relative to the support part and relative to the machine tool in the state in which the body part is fixed to the main shaft of the machine tool and the main shaft is rotating.

10. The cooling medium spray device as defined in claim 1, wherein the pump is an internal gear pump.

11. The cooling medium spray device as defined in claim 10, wherein the nozzle is configured to be not rotatable relative to the support part and relative to the machine tool in the state in which the body part is fixed to the main shaft of the machine tool and the main shaft is rotating.

12. The cooling medium spray device as defined in claim 11, wherein:
the body part has a first passage portion having a longitudinal extension that extends in the axial direction,
the body part has a second passage portion that is fluidly connected with the first passage portion of the body part,
the second passage portion has a longitudinal extension that extends in a radial direction that is perpendicular to the axial direction, and
the second passage portion of the body part is fluidly connected with the first passage of the support part.

13. The cooling medium spray device as defined in claim 12, wherein the inlet port and the outlet port of the pump are each fluidly connected with the support part interior space of the support part such that cooling medium flows radially through the inlet port and through the outlet port.

14. The cooling medium spray device as defined in claim 13, wherein:
the support part has a cover that partially defines the support part interior space and surrounds a portion of the body part, and
the cover is configured to be coupled to the machine tool so that the cover is not rotatable relative to the machine tool in the state in which the body part has been coupled to the main shaft of the machine tool;
the cover comprises:
a rotation stopping pin movably disposed in a hole, the rotation stopping pin being biased in parallel to the axial direction towards a rear end side of the cooling medium spray device, and
a rotation stopping lever extending from the rotation stopping pin in a direction perpendicular to the axial direction,
the cover is configured such that attachment of the cooling medium spray device to the machine tool causes the rotation stopping pin to be pushed towards a front end side of the cooling medium spray device from a first position, in which the rotation stopping lever is engaged in an engagement part of the body part to block rotation of the body part and the rotating part of the pump relative to the support part, to a second position, in which the rotation stopping lever is disengaged from engagement part of the body part to allow rotation of the body part and the rotating part of the pump relative to the support part.

15. A cooling medium spray device configured to pressurize a cooling medium supplied via a main shaft of a machine tool and to spray the pressurized cooling medium, comprising:
a body part having a body part passage that extends in an axial direction, the body part being configured such that the cooling medium supplied from the main shaft will flow through the body part passage while the body part is coupled to the main shaft of the machine tool;
a support part having an interior space, a first passage and a second passage, the body part being rotatably disposed in the interior space of the support part, the support part being configured to be fixed to the machine tool while the body part is coupled to the main shaft of the machine tool so that the support part is not rotatable relative to the machine tool;
a pump having a rotating part, an inlet port and an outlet port, the rotating part being rotatably disposed within the interior space of the support part and being rigidly connected to the body part to rotate therewith, and the pump being configured such that rotation of the rotating part relative to the support part causes the pressure of the cooling medium that is being suctioned via the inlet port to be increased and the pressurized cooling medium is caused to be discharged from the outlet port;
a cap having a cap passage that fluidly communicates with a nozzle hole of the cap, the cap being fixedly mounted on the support part on a side of the pump that is opposite of the body part, the cap closing up the interior space of the support part; and
a nozzle fixedly mounted in the nozzle hole and having a nozzle passage that fluidly communicates with a spray port of the nozzle and with the cap passage,
wherein the body part passage of the body part fluidly communicates with the inlet port of the pump via the first passage of the support part, and the outlet port of the pump fluidly communicates with the cap passage of the cap via the second passage of the support part.

16. The cooling medium spray device as defined in claim 15, wherein the nozzle is configured to be not rotatable relative to the support part and relative to the machine tool in the state in which the body part is fixed to the main shaft of the machine tool and the main shaft is rotating.

17. The cooling medium spray device as defined in claim 16, further comprising a relief valve configured to open a relief valve passage in fluid communication with the second passage of the support part in case the pressure of the cooling medium exiting the outlet port of the pump reaches a predetermined pressure or higher.

18. A coolant spraying device, comprising:
a body part having a body part passage that extends in an axial direction, the body part being configured such that cooling medium supplied from a main shaft of a machine tool will flow through the body part passage while the body part is fixedly coupled to the main shaft of the machine tool;
a support part having an interior space, a first conduit and a second conduit, the body part being rotatably disposed in the interior space of the support part, the support part being configured to be fixed to the machine tool while the body part is fixedly coupled to the main shaft of the machine tool so as to be non-rotatable relative to the machine tool;
a pump having a rotating part, an inlet port and an outlet port, the rotating part being rotatably disposed within the interior space of the support part and being connected to the body part to rotate therewith, and the pump being configured such that rotation of the rotating part increases the pressure of the cooling medium that is being suctioned via the inlet port and causes the pressurized cooling medium to be discharged from the outlet port;
a cap having a cap passage that is in fluid communication with a nozzle hole of the cap, the cap being fixedly mounted on the support part on a side of the pump that is opposite of the body part, the cap closing up the interior space of the support part; and
a nozzle fixedly mounted in the nozzle hole and having a nozzle conduit that is in fluid communication with a spray port of the nozzle and with the cap passage,
wherein the body part passage of the body part is in fluid communication with the inlet port of the pump via the first conduit of the support part, and the outlet port of the pump is in fluid communication with the cap passage via the second conduit of the support part.

19. The coolant spraying device as defined in claim 18, further comprising a relief valve configured to open a relief valve passage in fluid communication with the second conduit of the support part in case the pressure of the cooling medium exiting the outlet port of the pump reaches a predetermined pressure or higher.

20. The coolant spraying device as defined in claim 19, wherein the nozzle is configured to be not rotatable relative to the support part and relative to the machine tool in the state in which the body part is fixed to the main shaft of the machine tool and the main shaft is rotating.

* * * * *